(12) United States Patent
Moore et al.

(10) Patent No.: US 8,243,892 B1
(45) Date of Patent: Aug. 14, 2012

(54) SYSTEM, APPARATUS AND METHOD FOR MANAGING SWITCH CAPACITY IN BROADCAST MESSAGING

(75) Inventors: Joe Harley Moore, Swansea, IL (US); John William Lindemann, III, St. Louis, MO (US); Aida Hadzisabic, St. Louis, MO (US)

(73) Assignee: GroupCast, LLC, St. Louis, MO (US)

( * ) Notice: Subject to any disclaimer, the term of this patent is extended or adjusted under 35 U.S.C. 154(b) by 438 days.

(21) Appl. No.: 12/627,872

(22) Filed: Nov. 30, 2009

(51) Int. Cl.
*H04M 1/64* (2006.01)
*G06F 7/00* (2006.01)
(52) U.S. Cl. .............. 379/88.23; 707/638; 707/802
(58) Field of Classification Search .... 379/88.01–88.23; 707/638, 802
See application file for complete search history.

(56) References Cited

U.S. PATENT DOCUMENTS

| | | | |
|---|---|---|---|
| 5,838,769 A | 11/1998 | McNeil et al. | |
| 5,881,140 A | 3/1999 | Gerault et al. | |
| 6,243,449 B1 | 6/2001 | Margulis et al. | |
| 6,678,358 B2 | 1/2004 | Langsenkamp et al. | |
| 7,002,915 B1 | 2/2006 | Huberman et al. | |
| 7,130,389 B1 | 10/2006 | Rodkey et al. | |
| 7,133,869 B2 | 11/2006 | Bryan et al. | |
| 8,131,678 B1* | 3/2012 | Moore et al. | 707/638 |
| 2004/0225733 A1 | 11/2004 | Tesink et al. | |
| 2006/0084412 A1 | 4/2006 | Epstein | |
| 2006/0252444 A1 | 11/2006 | Ozugur | |
| 2007/0070989 A1 | 3/2007 | Savoor et al. | |
| 2007/0123288 A1 | 5/2007 | Hofbauer et al. | |
| 2007/0291925 A1 | 12/2007 | Goldman et al. | |
| 2008/0279183 A1 | 11/2008 | Wiley et al. | |
| 2010/0273443 A1* | 10/2010 | Forutanpour et al. | 455/404.1 |
| 2011/0178947 A1* | 7/2011 | McNutt et al. | 705/346 |
| 2011/0261933 A1* | 10/2011 | Moore et al. | 379/88.12 |

* cited by examiner

*Primary Examiner* — Davetta W Goins
*Assistant Examiner* — Mohammad Islam
(74) *Attorney, Agent, or Firm* — Husch Blackwell LLP

(57) ABSTRACT

A system, apparatus and method for identifying the capacity of a particular switch through which a plurality of telephone calls will be broadcast has a processor in operative communication with a communication network and an NPANXX database, and is configured to retrieve a telephone number from a call list from a call list database, then to retrieve from the NPANXX database a CLLI identification associated with the retrieved telephone number. The processor is configured to retrieve a maximum call capacity for a switch associated with the retrieved CLLI identification from a CLLI limit database. The processor is configured to store a number of current calls being made through the switch associated with the retrieved CLLI identification and to make a next telephone call when the number of current calls is less than or equal to the maximum call capacity.

15 Claims, 5 Drawing Sheets

SYSTEM, APPARATUS AND METHOD FOR MANAGING SWITCH CAPACITY IN BROADCAST MESSAGING

CROSS-REFERENCE TO RELATED APPLICATIONS

None.

BACKGROUND OF THE INVENTION

1. Field of the Invention

The field of the invention is in telecommunications, particularly broadcast message transmission of a plurality of messages.

2. Related Art

Certain organizations, for example school districts and youth sports leagues, frequently need to send a single message to a plurality of receivers. Such messages may include emergency notices, for example warnings of weather related problems like hurricanes. Certain other messages may be non-emergencies but time sensitive nonetheless, such as a scheduling change for a little league game. In order to send such broadcast messages, products and services have been developed for the relevant organizations, such as those offered by the applicant herein, Groupcast, LLC.

Some broadcast messaging services send telephone messages in the form of a voicemail through the traditional publicly switched telephone network ("PSTN"). Other services may offer voicemail services through the voice over internet protocol ("VOIP"). Both access the cellular telephone network. In any case, certain hardware structures and standardized protocols must be used and are unavoidable to broadcast messages at all. Furthermore, the limitations and requirements of the telecommunications infrastructure, whether the publicly switched network or the Internet, must be addressed in order to achieve acceptable or advantageous success rates for message deliveries and acceptable or advantageous speed in delivering them.

One limit of the telecommunications infrastructure is that the number of telephones in a community or given geographic area served by terminal structure such as a class 5 switch typically exceeds the capacity of that switch. Normally, there are not many calls made at a single time, and so normal needs are met by a switch having a capacity that is only a fraction of the telephones served by that switch. However, in the event of broadcast messaging of many calls either simultaneously, or sequentially in a matter of a few seconds, switch capacities may be overwhelmed, especially in rural areas where class 5 switches tend to have smaller capacities, disadvantageously interrupting service and slowing the ultimate delivery of the broadcast message to all attempted recipients.

Prior art systems to manage infrastructure capacity typically monitor call failure rates and either re-route calls within the communication network or suspend calling if the failure rate exceeds a threshold, as for example by "gapping." The state of the art then is in effect a back end watch for the crash or overload of a terminal switch, and not the prevention of the overload in the first instance. Prior art systems all require feedback from the communications network being used, and prior art systems typically cannot be operated by a single server outside a point of presence with the communications network.

SUMMARY OF THE INVENTION

The present invention is a system, apparatus and method for identifying the capacity of a particular switch through which a plurality of telephone calls will be broadcast, meeting that capacity with the appropriate number of telephone calls, delaying placement of calls exceeding the switch's capacity until previous calls are completed, making the delayed calls when the switch's capacity becomes available, and thereby achieving maximum speed and throughput while avoiding a disadvantageous overload of the switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF INVENTION

Figure 1:
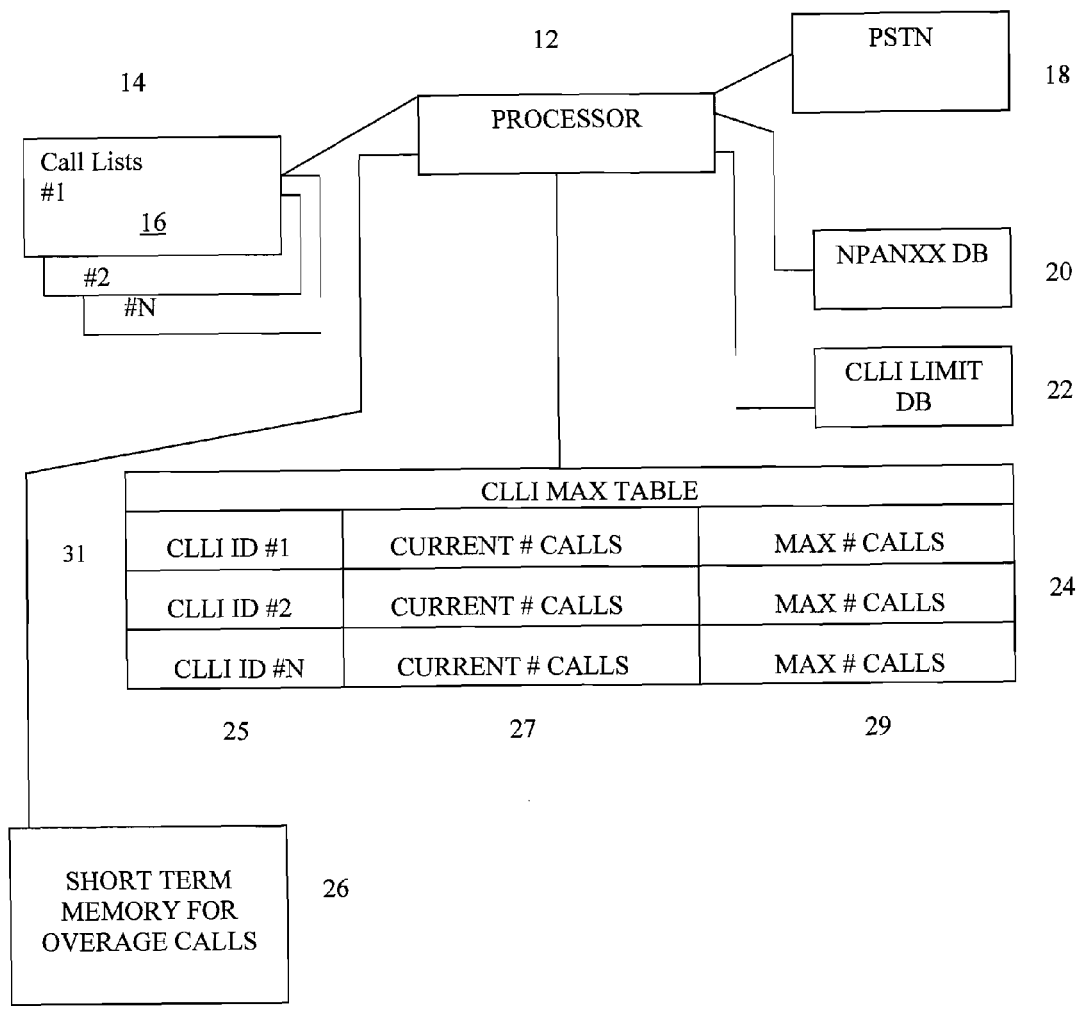
FIG. 1 is a block diagram of the components of the switch capacity management system.

Referring now to the drawings in which like numbers indicate like elements, the system and apparatus of the present invention 10 includes the components depicted in FIG. 1. A computer processor 12 is in operative communication with a database 14 holding a plurality of call lists 16 and is further in communication with the a communication network, such as the publicly switched telephone network 18, the Internet or the cellular network. The computer processor 12 is also in operative communication with an NPANXX database 20, and a CLLI limit database 22. The CLLI limit database 22 stores the maximum capacities for individual switches identified by the Common Language Location Identifier ("CLLI"). The CLLI limit database 22 may include switches in the PSTN, which may be terminal or class 5 switches, cellular switches and/or SONUS boxes. The processor has the capacity to generate CLLI maximum tables 24 and to create, populate and maintain a short term memory 26 for over limit calls. The CLLI maximum table 24 may include a CLLI # column 25, a current number of calls being made 27 and a maximum number of calls that can be made 29 simultaneously through that switch. With the depicted architecture, the present invention may be advantageously executed by a single server, and/or by a server that is outside the communications network through which the broadcast message is being sent.

Figure 2:
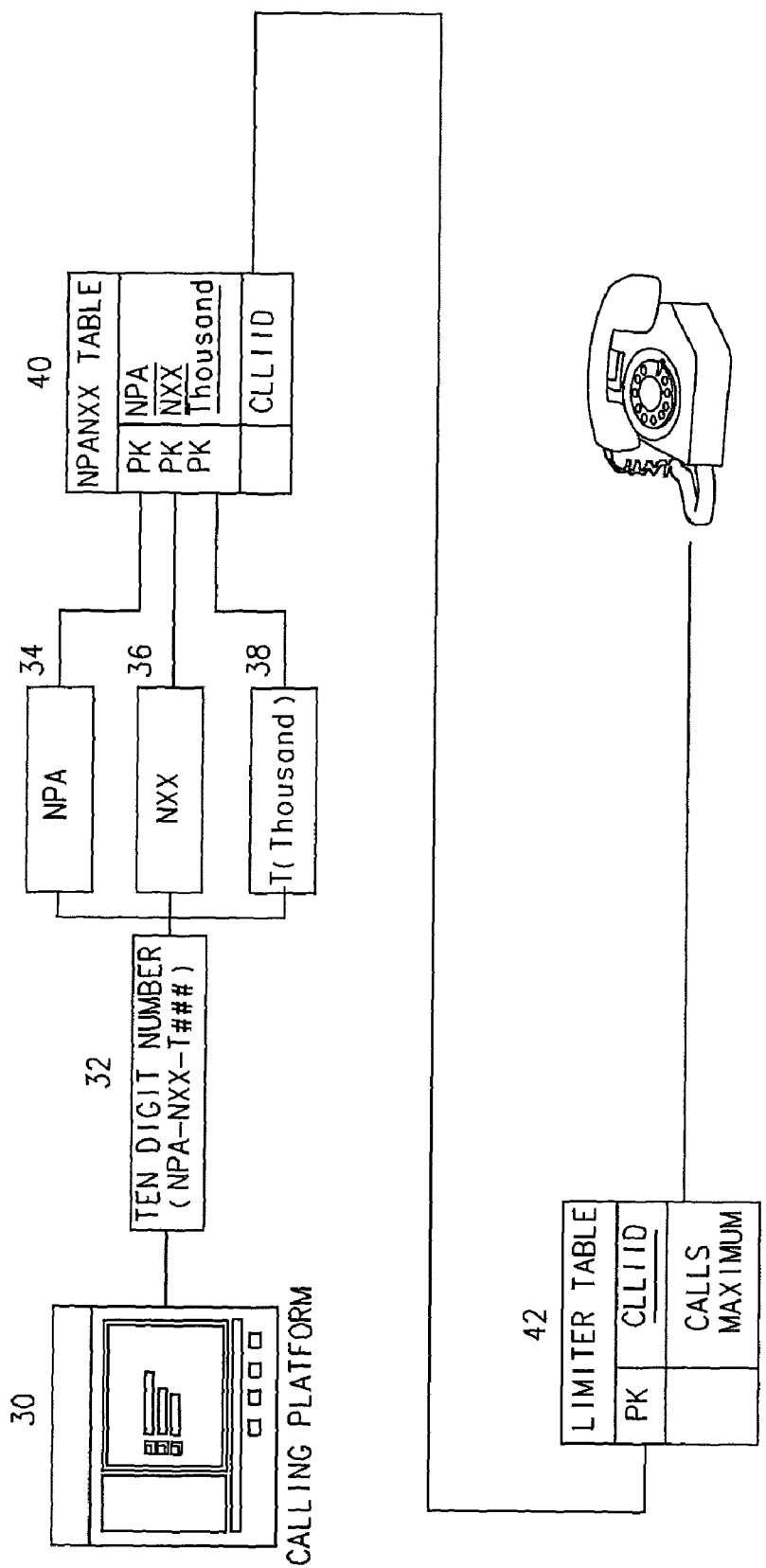
FIG. 2 is a flowchart depicting the general process of the switch capacity management system.

FIG. 2 is a flowchart generally indicating the method of the present invention. This includes a calling platform 30 in which the processor 12 resides. For each ten digit number 32 to be called from one of the lists 16, the number is divided into and/or examined for its NPA or area code 34, its exchange or NXX value 36 and a thousands digit 38. These numbers are compared to an NPANXX table 40 from the NPANXX database 20. This comparison may be made in recursive fashion. The NPANXX table 40 yields a CLLI ID number for the proper switch for that number, which may be a terminal switch, class 5 switches or SONUS box. Having the proper switch identified, the switch is looked up on the limiter table 42 according to its CLLI ID number. Primary keys "PK" may uniquely identify each row in the NPANXX table 40 and/or the CLLI ID in the limiter table 42. A maximum capacity for that switch is recalled from the CLLI limiter table 42. Based on the CLLI ID and the total calls currently being processed, the call will be either made or queued for the next available port, as described below. The maximum call capacity for a given switch may in one embodiment be compiled from empirical data gathered from call history databases over time and entered into the limiter table database 42. A maximum can be accurately approximated by reviewing historical data for call connection failures versus a number of calls made through the individual switch.

Figure 3A:
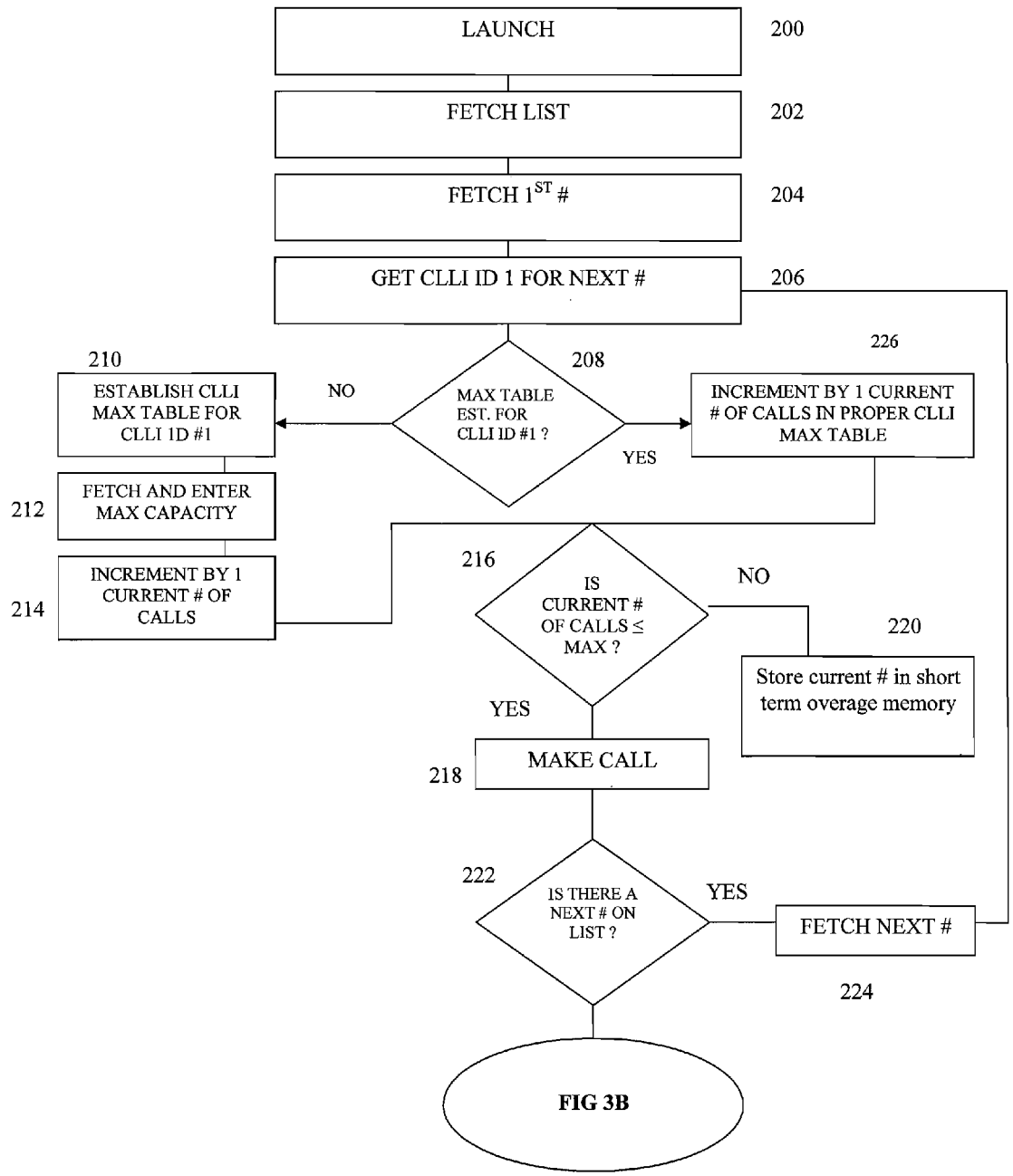
FIG. 3 is a flowchart depicting the managed calling routine.
Figure 3B:
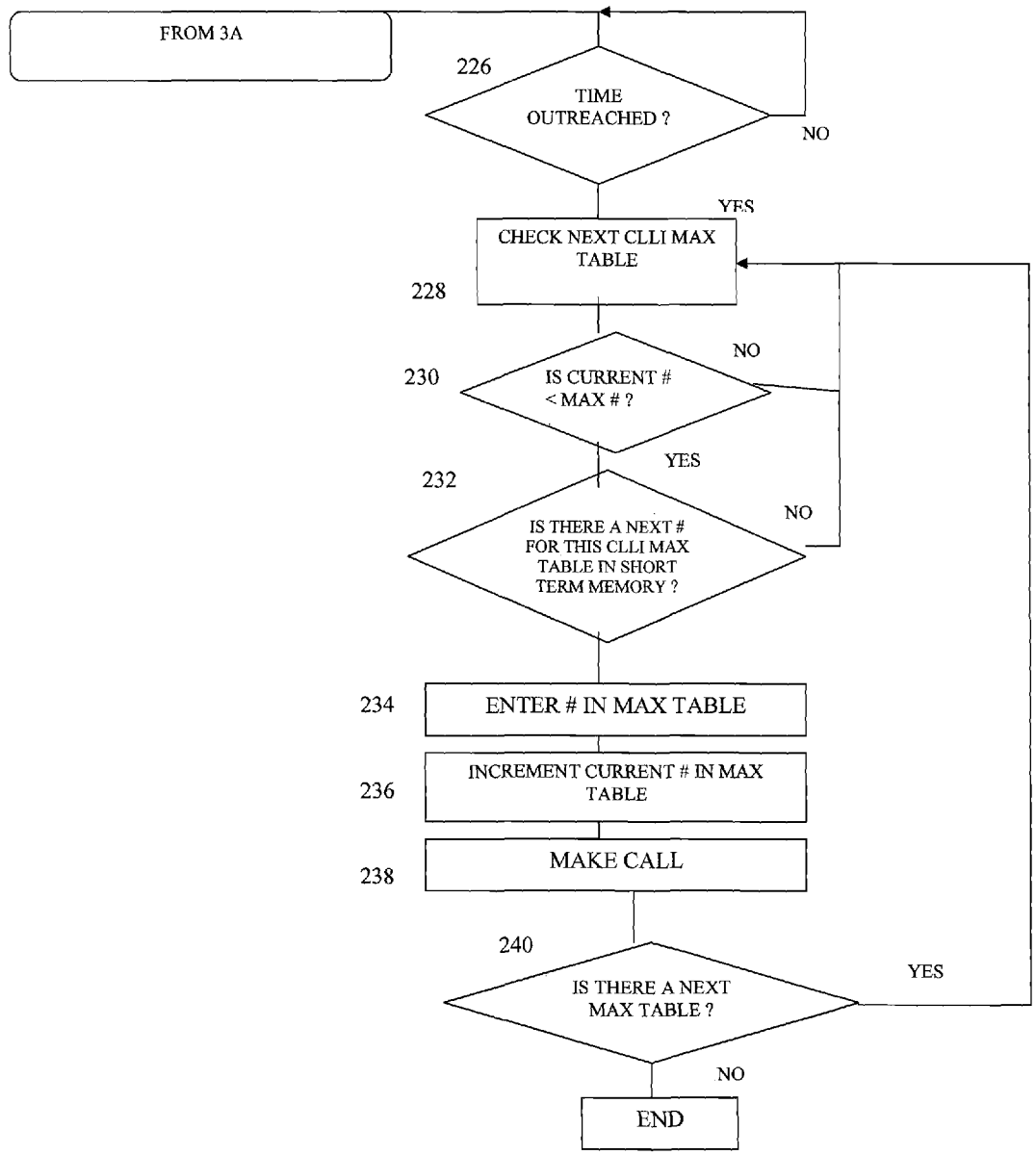

As depicted in Flow Chart FIG. 3, in operation the CLLI Limiter works as follows. A broadcast message signal to launch is received 200. The system fetches the list 16 of phone numbers to call 202. The system fetches the first number 32 in the list at step 204. The first seven digits 34, 36, 38 of the ten-digit phone number are compared to the NPANXX database 40 at step 206 to get the CLLI identification number ("CLLI ID"). At step 208 the system looks to see if a maximum table has been established for the switch having that CLLI ID, or, alternatively, if a row in a larger maximum table has been established for the switch having that CLLI ID. For the first number, the answer will be no, and the next process step 210 will be to establish a maximum call table for that CLLI ID. To establish a next CLLI ID maximum table, the maximum call capacity for the switch identified by that CLLI number is retrieved 212 from the CLLI ID maximum call database 42. That maximum number is also entered at step 212 into the CLLI ID maximum table 24 in the maximum number of calls column 29. The current number of calls column 27 in the CLLI ID maximum table now established is incremented to one at step 214. The current telephone number is stored in association with that Max table. The number of current calls in the CLLI ID maximum table is checked at step 216 to see if it is less than or equal to the maximum number of calls possible for the switch corresponding to that CLLI ID. If the answer is yes, the call is made 218. If the answer is no, the number is entered into a short-term memory 26 at step 220.

Next, the process checks whether there is a next telephone number in the list 16 at step 222. If so, it fetches the next number from the list at step 224. That number is returned to step 206 to look up the CLLI ID for that telephone number. At step 208, the process checks to see if the retrieved CLLI ID for the next telephone number already has a table established, or a row established in a larger maximum table. If the answer is yes, the current call number for that CLLI ID max table is incremented by one at step 226. That telephone number is stored in association with that max table. The current number of calls in the CLLI ID max table is checked to see if it less than or equal to the maximum number of calls at step 216 once again, with the same consequences for either a yes or a no value. The system checks for a next telephone number 222, and, if finding one, fetches that next number at step 224 and repeats step 206. In the event that a next number is found to correspond to a CLLI ID that does not have a CLLI ID max table established at step 208, a next new CLLI ID max table is established again at step 210. This process repeats. This process is executed as the calls comprising the broadcast message are being made. Typical broadcast messages deliver a voice mail message on the order of 10 to 120 seconds long to a number of recipients that may range from a handful to tens of thousands.

It is within the scope of the present invention that a CLLI max table may be created and/or maintained for each switch identified by a CLLI ID, as depicted. Alternatively, new maximum tables or a new single maximum table may be created for each broadcast message, or a single maximum table may be maintained for each broadcast message, or a single maximum table may be maintained for a plurality of broadcast messages. In the event that the later embodiments are used, a CLLI ID for each different switch identified by a CLLI ID would be entered in its own row in a maximum table at step 210, rather than a separate table, and at step 208 a new CLLI ID number for a new broadcast would be searched for by row, rather than by separate table.

The system and apparatus periodically at step 226 checks a queue for each CLLI ID maximum call table 228 or each row 31. If the number of current calls in the maximum table is found to be less than the number of maximum calls 230, the short-term memory is checked for any stored telephone numbers for that CLLI # by max table 24 or by row 31 at step 232. If there is a stored telephone number, the telephone number from the short-term memory is retrieved. That number is stored in association with that max table 234. The current number of calls in the CLLI ID maximum call table is incremented by one 236. The telephone number is called at step 238. The CLLI maximum table and short term memory are managed without the need of any input of additional data such as a rate of failed calls or switch congestion information.

The routine checks to see if there is a next max table 24 or row 31 to update at step 240. If there is, the routine returns to step 228. If not, the routine ends.

Figure 4:
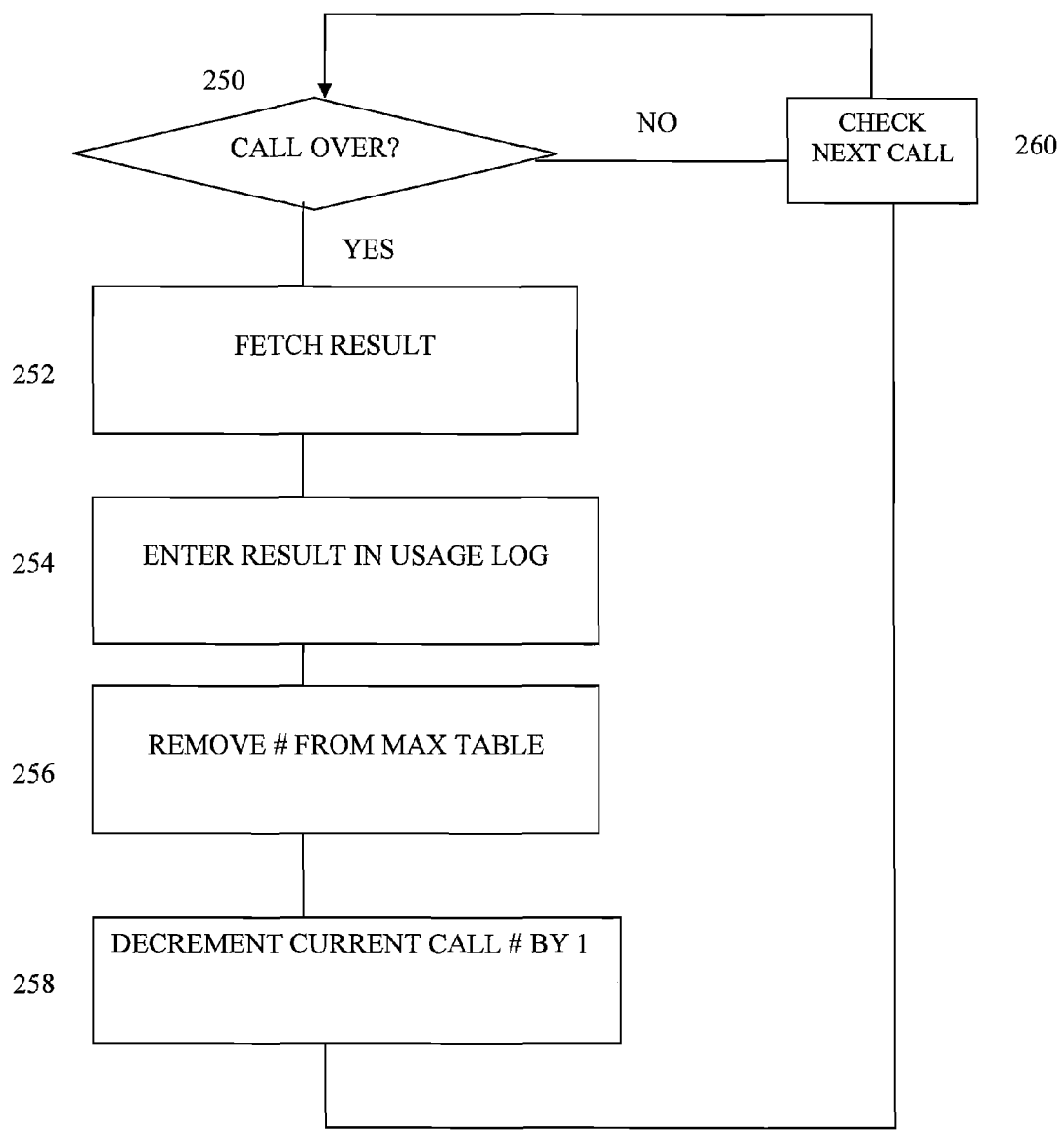
FIG. 4 is a flowchart depicting the call conclusion routine.

Separately, as seen in FIG. 4, a conclusion of each call 250 is followed by a fetch of the results of that call (completed, busy, failed) 252. The results are entered in a usage log 254. That finished call telephone number is removed from its association with its corresponding max table 256. The current number of calls in that max table is decremented by one 258. A check for a next finished call is made 260 and the routine repeats until all calls are finished. The usage log may be used to create a separate list of failed calls that can be re-tried after a preconfigured time.

When there are no more numbers to fetch on the call list 16 at step 204, no more stored calls in the short-term memory at step 232, and a last check for stored calls 260 has been implemented at the conclusion of the last call in the last CLLI ID maximum table with no more calls to be made found, the routine ends. As will be appreciated by those of skill in the art, the process embodied herein prospectively reduces the likelihood of call failures due to switch overloads, rather than reacting to overloads already occurring, and advantageously does so without the need for terminal equipment feedback from the communications network.

The scope of this invention includes switches in the PSTN, and also VOIP hardware and software, including for example SONUS boxes, which are also assigned CLLI numbers, and cellular equipment, hardware, software and switching architecture and "switch" as used herein may refer to any of these or any combination thereof. For each type of switch, the system, apparatus and method advantageously prevents switch overload and/or maintains a maximum or near maximum usage of the switch during execution of a message broadcast.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A switch manager for broadcast messaging comprising:
a processor;
said processor being in operative communication with a communication network and an NPANXX database;

said processor being configured to retrieve a call list from a call list database, and a telephone number from said call list, said processor being configured to retrieve from the NPANXX database a CLLI identification associated with the retrieved telephone number;

said processor being configured to retrieve a maximum call capacity for a switch associated with the retrieved CLLI identification from a CLLI limit database;

said processor being configured to store a number of current calls being made through the switch associated with the retrieved CLLI identification; and said processor being configured to make a next call when said number of current calls is less than or equal to said maximum call capacity;

said processor being further configured to queue a call for a next available port when said number of current calls is greater than said maximum call capacity whereby said switch management is executed outside the communications network through which the broadcast message is being sent and without any input of additional data from the communication network and said switch management reduces an incidence of overloading an identified switch.

2. The switch manager of claim 1 further comprising said communication network being the publicly switched telephone network.

3. The switch manager of claim 1 further comprising said communication network being voice over internet protocol or the cellular telephone network.

4. The switch manager of claim 1 further comprising said CLLI identification being identification of at least one of a terminal switch, a class 5 switch, a cellular switch and a SONUS box.

5. The switch manager of claim 1 further comprising said storage of said number of current calls being made through the switch associated with the retrieved CLLI identification being by establishment of a CLLI maximum table.

6. The switch manager of claim 1 further comprising said CLLI maximum table includes a current number of calls being made through the identified switch and a maximum number of calls that can be made through the identified switch.

7. The switch manager of claim 6 further comprising said CLLI maximum table including a CLLI # column such that a row is maintained for each of said retrieved CLLI identifications.

8. The switch manager of claim 5 further comprising said CLLI maximum table being established separately for each broadcast message.

9. The switch manager of claim 5 further comprising said CLLI maximum table being established separately for each switch identified.

10. The switch manager of claim 5 further comprising said CLLI maximum table being maintained for a plurality of broadcast messages.

11. The switch manager of claim 1 further comprising said switch management being executed by a single server.

12. The switch manager of claim 1 further comprising said switch management maintaining a maximum or near maximum usage of the identified switch during execution of a message broadcast.

13. The switch manager of claim 1 further comprising said maximum call capacity for an identified switch being compiled from empirical data.

14. The switch manager of claim 1 further comprising said additional data from the communication network including a rate of failed calls or a switch congestion information.

15. A switch management system for broadcast messaging comprising:

a processor;

said processor being in operative communication with a communication network and an NPANXX database;

said processor being configured to retrieve a call list from a call list database, and a telephone number from said call list, said processor being configured to retrieve from the NPANXX database a CLLI identification associated with the retrieved telephone number;

said processor being configured to retrieve a maximum call capacity for a switch associated with the retrieved CLLI identification from a CLLI limit database;

said processor being configured to store a number of current calls being made through the switch associated with the retrieved CLLI identification; said storage of said number of current calls being made through the switch associated with the retrieved CLLI identification being by establishment of a CLLI maximum table;

said processor being configured to make a next call when said number of current calls is less than or equal to said maximum call capacity;

said processor being further configured to queue a call for a next available port when said number of current calls is greater than said maximum call capacity whereby said switch management is executed outside the communications network through which the broadcast message is being sent and without any input of additional data from the communication network and said switch management reduces an incidence of overloading an identified switch.

\* \* \* \* \*